Figure 1:
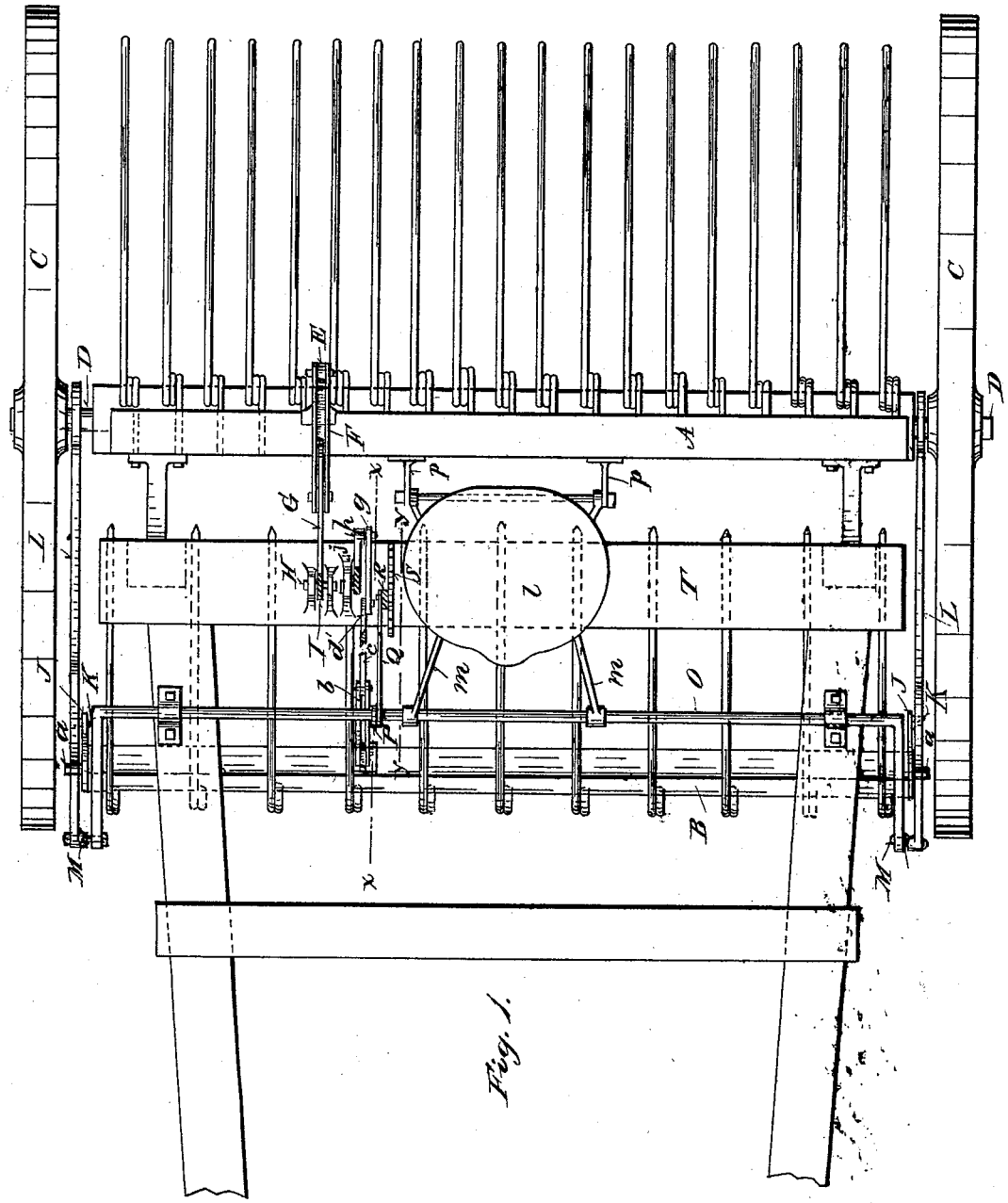

(No Model.) 2 Sheets—Sheet 1.

B. F. SMITH.
HAY RAKE.

No. 517,246. Patented Mar. 27, 1894.

WITNESSES
A. D. Wiseman
H. M. Plaisted

INVENTOR
Benjamin F. Smith
By H. A. Toulmin,
Attorney.

THE NATIONAL LITHOGRAPHING COMPANY,
WASHINGTON, D. C.

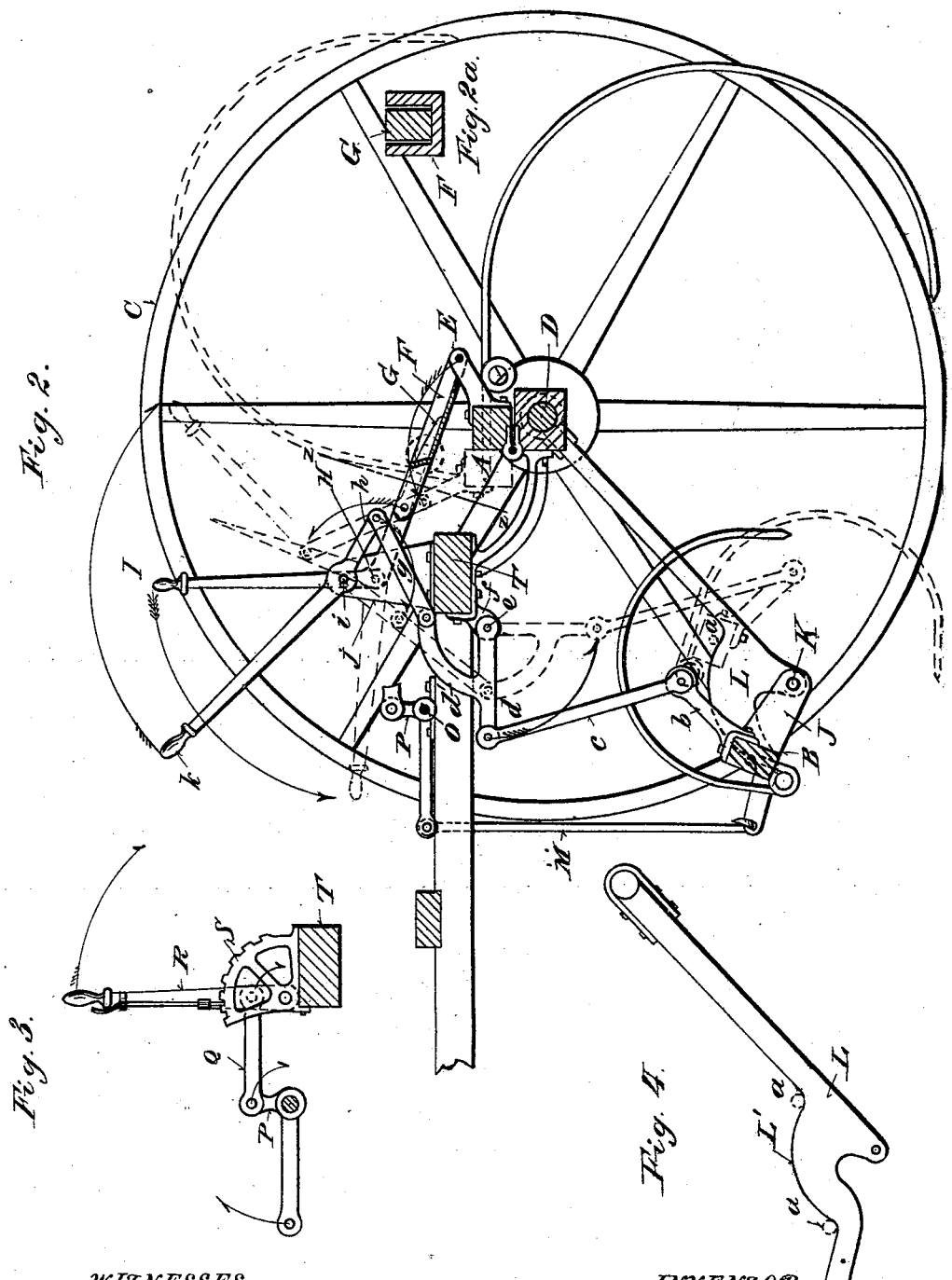

UNITED STATES PATENT OFFICE.

BENJAMIN F. SMITH, OF SPRINGFIELD, OHIO, ASSIGNOR OF TWO-THIRDS TO THOMAS C. ACKERSON AND EDWARD H. ACKERSON, OF SAME PLACE.

HAY-RAKE.

SPECIFICATION forming part of Letters Patent No. 517,246, dated March 27, 1894.

Application filed April 1, 1891. Renewed December 5, 1893. Serial No. 492,879. (No model.)

*To all whom it may concern:*

Be it known that I, BENJAMIN F. SMITH, a citizen of the United States, residing at Springfield, in the county of Clark and State of Ohio, have invented certain new and useful Improvements in Hay-Rakes, of which the following is a specification, reference being had therein to the accompanying drawings.

My invention relates to certain new and useful improvements in hay rakes.

The object of my improvements is to provide means for raking under the windrow, in order to avoid leaving portions of the hayfield unraked, and said improvements have reference to a combination of two independent rake-heads and their teeth and operative means for said heads, adapted to attain said object; have reference to one form of operative means for dumping said rakes; and have reference to a hanger bracket for raising and lowering one rake and operative mechanism for the same; and have reference to other points of detail hereinafter described and claimed.

I will first describe the action of these combined rakes, and then one form of mechanism for operating the same whereby the above described results are attained.

In the accompanying drawings, forming a part of this specification, and on which like reference letters indicate corresponding parts, Figure 1 represents a plan view of my combination rake; Fig. 2 a vertical section on the line x, x, of Fig. 1; Fig. 2ª, a section on z, z, of Fig. 2; Fig. 3, a vertical section of a portion of the rake on y, y, of Fig. 1; and Fig. 4, a detached view of a hanger bracket for the front rake.

The letter A designates the rear rake head and supported tines, the letter B the front rake head and its tines, the tines being of any convenient form, preferably of a coil spring pattern. The tines in the front rake head need not be so closely spaced as in the rear rake head, as is indicated in Fig. 1. The supporting wheels C carry the axle D, to which is pivoted or hinged, the said rear rake A.

The action of the machine is as follows: I start with the front rake up and the rear rake down in its raking position and continue until a sufficient load has been raked. I then drop the front rake B to the dotted position by means hereinafter described, thus beginning to rake with the front rake while the rear rake still carries its load. When a clear space has been raked by the front rake, I raise the rear rake thus dumping its load upon the ground already raked by the front rake, leaving it in a clear, sharply defined windrow, which has been deposited upon raked ground. There are therefore, no straggling wisps of hay, for the ground is clean on both sides of the windrow and has been raked underneath. When the rear load has been dumped, the rear rake is lowered and the front rake is raised, thus dumping its load in front of, or directly into, the rear rake, which continues to rake until another full load has been collected. The above described action is then repeated by dropping the front rake, raking a clear space, and dumping the rear load upon said space just raked.

Attached to the rear rake head is a bracket arm E, connected by a link F with a lever G pivoted at H and having a handle I, which, when operated to the dotted position in the direction of the arrow, Fig. 2, will rotate the rear rake head and raise the tines to the upper position indicated by the dotted line, and thus dump the contained load. The link F is preferably formed U-shaped as shown in the cross section, Fig. 2ª, and the lower end of the lever G is adapted to extend along the U-shaped portion and thus form a stop for the rake head in its lower position. It is not necessary to provide a ratchet or catch for the handle I in the dotted position, since the raising and lowering of the rear rake head is performed in one forward and back motion as above described.

The arrows indicate the positions that the pivotal points assume when the rake is in its raised position.

The front rake may be supported in any convenient manner, such as by means of an arm J pivoted at K to a hanger bracket L, rotatably supported at one end to the axle D, or otherwise, and connected by a link M, at the other end, to an arm of a crank rod O, provided with a crank P connected by a link Q, or otherwise, to a lever handle R having a catch, meshing with a segment S mounted on the frame, or cross piece, T, of the machine. The operation of the handle R in the direction of the arrow in Fig. 3, will thus rotate the crank rod O, and elevate the front rake more or less from the ground. This is an advantage in passing over hollows or ridges of the ground, enabling the rake to take up all the hay lying there. The said bracket L is also preferably provided with a guiding surface L', Fig. 4, adapted to steady or guide the rake head B by means of a pin a, impinging thereon, as indicated by the dotted lines, as the head is rotated and the rake assumes its lower position. This guiding surface steadies the rake head during its rotation, and receives through the pin A, some or all, of the bearing weight from the pivot K. The wearing of the pivot K will bring the weight more and more on the guiding surface. It serves also as a safety device in case of the breaking of the pivot. The pin a, checks the rotation of the head at each end of the guiding surface L, by impinging on the turned up portions of the bracket. This rotation is conveniently effected by means of an arm b secured to the said head B, and connected by a link c with a lever arm d, pivoted at e to lugs or brackets f supported by said cross piece T, or otherwise. The said arm d is preferably provided with an upward extension d', connected by a link g with one end h, of a lever pivoted at i to a stand j, and provided with a handle k, whereby when said handle is operated to the dotted position in the direction of the arrow, Fig. 2, the front rake will be operated to its lower position, as indicated by the position of the parts in the dotted lines in that figure.

Any convenient form of seat may be used for this hay-rake, or the form illustrated in Fig. 1 may be used, in which the seat l is supported on braces or legs m, the front ends of which conveniently rest upon the said cross-rod O, and the rear ends have a pivotal connection with brackets p secured to the rear rake head A. By this means the weight of the driver assists in raising the rear rake to its upper position. Any other form of seat may, however, be employed. The usual thills Y, Y, and other portions of the machine adapting it for use as a horse hay-rake, are employed, but not described or illustrated since they form no part of my invention.

Having thus fully described my invention, what I claim as new, and desire to secure by Letters Patent, is—

1. In a hay rake, the combination with a suitable carrying frame, hanger brackets each pivoted at one end to said frame, and a rake head mounted in said brackets, of lever mechanism to adjust the other ends of said brackets and consisting of a double arm crank-shaft, and an operating hand lever having a catch, and link connections between the respective crank arms and said hand lever and brackets, whereby the adjustment of said brackets and rake at different heights from the ground, is facilitated, and readily effected during the operation of the machine.

2. In a hay-rake, the combination with a suitable carrying frame, hanger brackets having guide surfaces and pivoted to said frame by one end of each, and lever mechanism connected to the other end of each bracket to adjust the same, of a rake-head having teeth and pivotally mounted in said brackets, a projection at each end of said head and adapted to bear on said guiding surfaces of said brackets, another rake-head having teeth and rotatably mounted in said frame, and lever mechanism to operate said rake-heads independently.

In testimony whereof I affix my signature in presence of two witnesses.

BENJAMIN F. SMITH.

Witnesses:
H. M. PLAISTED,
OLIVER H. MILLER.